United States Patent
Yang et al.

(10) Patent No.: US 6,438,113 B1
(45) Date of Patent: Aug. 20, 2002

(54) METHOD FOR SHARING AN ASSOCIATED CONTROL CHANNEL OF MOBILE STATION USER IN MOBILE COMMUNICATION SYSTEM

(75) Inventors: Soon Sung Yang; Pyung Jung Song; Kyoung Joon Lee; Hun Lee, all of Daejon-Shi (KR)

(73) Assignee: Electronics and Telecommunications Research Institute, Daejon (KR)

( * ) Notice: Subject to any disclaimer, the term of this patent is extended or adjusted under 35 U.S.C. 154(b) by 0 days.

(21) Appl. No.: 09/143,284

(22) Filed: Aug. 28, 1998

(30) Foreign Application Priority Data

Oct. 13, 1997 (KR) ............................................. 97-52234

(51) Int. Cl.$^7$ ................................................ H04Q 7/20
(52) U.S. Cl. ......................... 370/329; 370/348; 370/338
(58) Field of Search ................................. 370/328, 329, 370/335, 341, 342, 469, 337, 338, 348; 455/451, 452, 450, 509, 517, 518

(56) References Cited

U.S. PATENT DOCUMENTS 5,805,078 A * 9/1998 Sugiyama et al. ..... 340/825.52
5,923,649 A * 7/1999 Raith .......................... 370/328
5,926,469 A * 7/1999 Norstedt et al. ............. 370/329
6,108,550 A * 8/2000 Wiorek et al. ............... 455/447
6,236,646 B1 * 5/2001 Beming et al. .............. 370/335
6,314,300 B1 * 11/2001 Nakashima et al. ......... 455/517

* cited by examiner

*Primary Examiner*—Chau Nguyen
*Assistant Examiner*—Duc Duong
(74) *Attorney, Agent, or Firm*—Cohen, Pontani, Lieberman, & Pavane

(57) ABSTRACT

A method for sharing an associated control channel in a mobile communication system is disclosed, which comprises the steps of: assigning a physical associated control channel between a mobile station and a base station and assigning a number of logical channels to the associated control channel, in order that a number of users can request communication service simultaneously through the mobile station; setting a logical link identification and a link setting flag not used when the mobile station receives a request for a new call setting, and transmitting a connection setting request to the base station through the physical associated control channel; informing the mobile station that the connecting and setting of logical link identification is completed through the physical associated control channel when the base station receives the connection request from the mobile station; and setting a traffic channel for transmitting user information after completing the connection setting.

3 Claims, 4 Drawing Sheets

METHOD FOR SHARING AN ASSOCIATED CONTROL CHANNEL OF MOBILE STATION USER IN MOBILE COMMUNICATION SYSTEM

BACKGROUND OF THE INVENTION

1. Field of the Invention

This invention relates to a method for sharing an associated control channel in which a radio signal channel formed in mobile station and base station is shared with a number of users, in the circuit and packet communication service provision of the 3 generation mobile communication.

2. Description of the Related Art

The IS-95 Code Division Multiple Access (CDMA) digital mobile communication system is a system for voice communication mainly, so it does not have much signal traffic. Accordingly, when a signal traffic needs to be transmitted, the system adopts the method that the quality of voice traffic is deteriorated to some extent. That is, when the signal needs to be transmitted without separating the signal channel from traffic channel, the signal was transmitted using the traffic channel only. Such signal transmission method is called in-band signal transmission method. However, this method could not satisfy user's service requirements since user requires various and high quality services. The various and high quality services require more signal traffics compared with simple services relatively, and the Quality Of Service (QOS) of user data is deteriorated and delay of signal traffic transmission occurs when signals are to be transmitted in the in-band method. This problem can be solved by transmitting the signal traffics using other channel different from user data transmission channel. This is called out-of-band signal transmission method.

In the signal channel setting method of mobile station and base station, the out-of-band signal transmission method requires each user to use more signal channels compared with in-band signal transmission method. Also, the informations transmitted through signal channel usually occur at the time of call setting and cancelling and have low frequency in use compared with traffic channel. Radio channel in mobile communication system is one of factors which determine the capacity of system. Accordingly, setting radio signal channel having low frequency in use for each call not only causes waste of radio resource but deteriorates capacity and performance of system.

SUMMARY OF THE INVENTION

An object of the invention is to provide a method for sharing an associated control channel of mobile station user in which a number of users who want to receive service from the mobile station can share signal channel using an associated control channel set between a mobile station and a base station in order to protect waste of radio resource caused by out-of-band signal transmission method.

A method for sharing an associated control channel in the mobile communication system in accordance with the invention comprises the step 1 to assigning a physical associated control channel between a mobile station and a base station and assigning a number of logical channel to the associated control channel, in order that a number of user can request communication service simultaneously through a mobile station; the step 2 to setting logical link identification and link setting flag not used when the mobile station receives request for new call setting, and transmitting the connection setting request to the base station through the physical associated control channel; the step 3 to informing the mobile station that the connecting and setting of logical link identification is completed through the physical associated control channel when the base station receives the connection request from the mobile station; and the step 4 to setting traffic channel for transmitting user informations after completing the connection setting.

The invention is characterized in that the mobile station in which a number of user can request various mobile communication service in a mobile station can protect the waste of radio resource by using signal channel which is being used already by other user without requesting associated control channel assignment to the base station whenever a number of user request service simultaneously in the third generation mobile communication system.

The third generation mobile communication system is a system in which a number of user can request variety of mobile communication service. So, it is possible to use the merit of out-of-band signal transmission method and to protect the waste of radio resource. Also, when a new call occurs, it becomes possible to set rapid call of mobile station by using associated control channel instead of random access channel which has high probability of conflict between users.

The above and further objects, aspects and novel features of the invention will become more apparent from the following detailed description when read in connection with the accompanying drawings.

BRIEF DESCRIPTION OF THE DRAWINGS

The above object, and other features and advantages of the present invention will become more apparent by describing the preferred embodiment thereof with reference to the accompanying drawings, in which.

Similar reference characters refer to similar parts in the several views of the drawings.

DESCRIPTION OF THE PREFERRED EMBODIMENT

Figure 1:
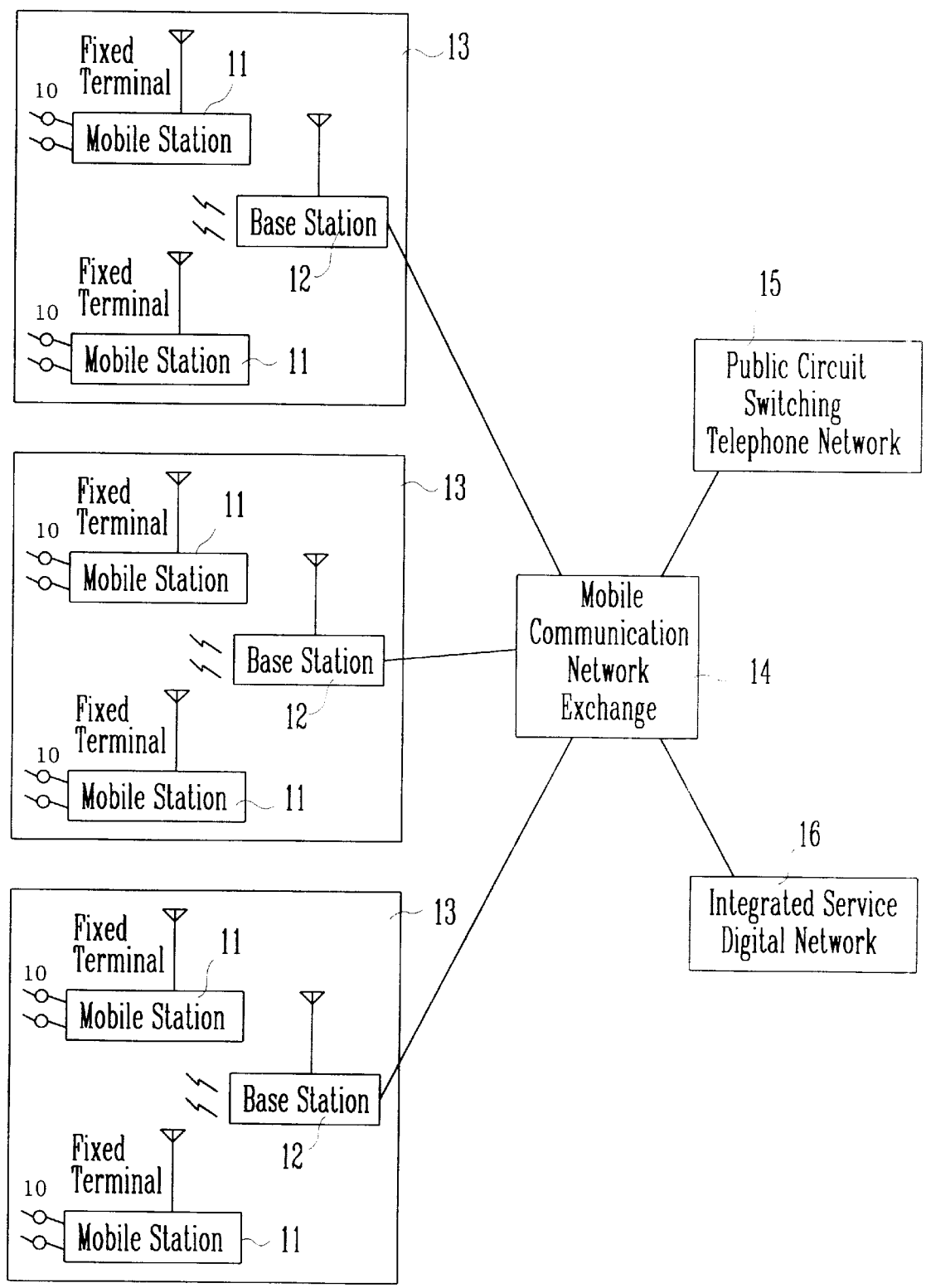
FIG. 1 shows a structural diagram of mobile communication system applying the invention.

The mobile station 11 has a matching apparatus which can communicate with peripheral fixed terminal 10 to support various user service. The fixed terminal 10 is Data Terminal Equipment (DTE) which is being used or will be used, for example, wire telephone, personal computer, a terminal for Integrated Service Digital Network. The matching apparatus of mobile station 11 reliably performs transmission function of signal occurred between mobile station 11 and fixed terminal 10, and the mobile station 11 becomes a terminating point on the radio connection protocol to the base station 12. The base station 12 is a terminating point on the radio connection protocol of network site and has wire interface function with a mobile communication network exchange. The mobile communication network exchange 14 has terminal exchange function or toll exchange function, and is connected to a fixed communication network such as public circuit switching telephone network 15 and integrated service digital network 16.

Figure 2:
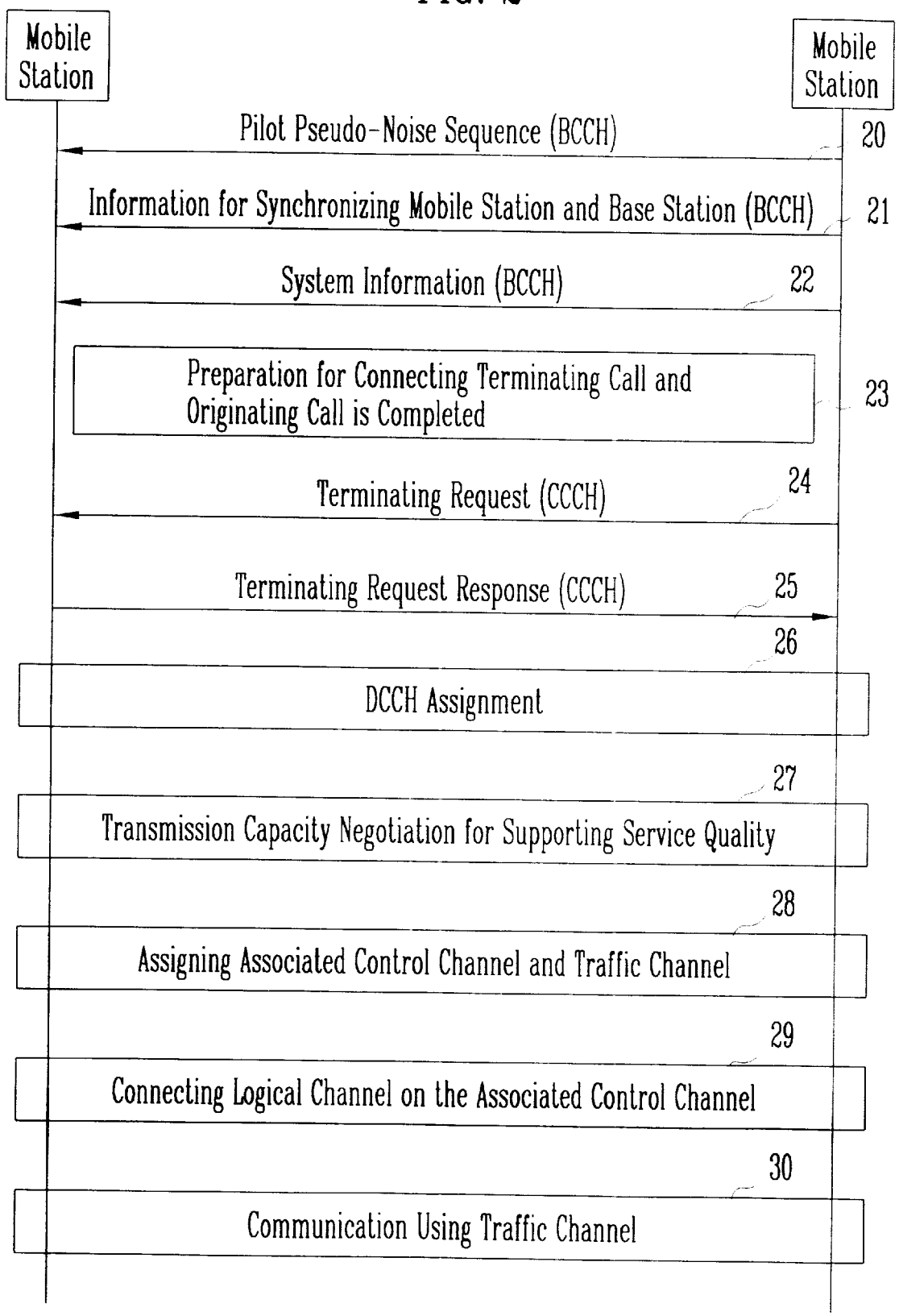
FIG. 2 is a flow chart showing a procedure in which the base station and the mobile station shown in FIG. 1 begin to communicate.

FIG. 2 is a flow chart showing a procedure in which the base station and the mobile station shown in FIG. 1 begin to communicate.

At first, the base station transmits a pilot pseudo-noise sequence, information for synchronizing the mobile station and the base station, and system information to mobile station through Broadcast Control Channel (BCCH) (steps 20, 21 and 22) (Here, BCCH is an one-way channel set from base station to terminal station. This channel transmits informations about system, for example, system ID, parameters for originating, hand over information).

Then, a preparation for connecting terminating call and originating call between mobile station and base station is completed (step 23), and the base station transmits terminating request signal through Common Control Channel (CCCH) (step 24). And then, the mobile station responds to the terminating request signal transmitted from the base station through the common control channel and transmits terminating request response signal (step 25) (Here, CCCH is a two-way control channel in the form of point-to-multipoint. And it is a channel which mobile station in the area controlled by a base station uses to set originating call and terminating call and to perform position registration).

Therefore, Standalone Dedicated Control Channel (SDCCH) is assigned between mobile station and base station (step 26) and then transmission capacity negotiation for supporting service quality is performed (step 27) (here, SDCCH is point-to-point two-way logical channel, transmits signals and user packet data and is set regardless of Traffic Channel assignment).

Also, Associated Control Channel (ACCH) and Traffic Channel (TCH) are assigned between mobile station and base station and logical channel association is connected on the ACCH (Here, ACCH is a point-to-point two-way logical channel which is assigned together with TCH, and transmits signals and user packet data. The signal informations transmitted relates to call setting, mobility management, and power management).

Then, TCH is point-to-point two-way logical channel, and is set to transmit user informations (voice and data).

The mobile station determines base station to communicate using informations transmitted through BCCH and sets terminating call and originating call using CCCH. SDCCH is set using informations which are transmitted and received through CCCH. SDCCH is set using the informations which are transmitted and received through CCCH. After checking the service requirements of terminating and originating mobile station using SDCCH, TCH and ACCH suitable for this is set. After the call information has been transmitted and received through ACCH, the user informations are transmitted using TCH. When another user requested new call using the mobile station which set ACCH or the base station received request for setting terminating call in the base station, only new TCH is assigned between mobile station and base station and ACCH is not assigned in addition. To do this, the base station resigning the assignment of TCH can have to determine if there is a call which is operating in relevant mobile station.

Figure 3:
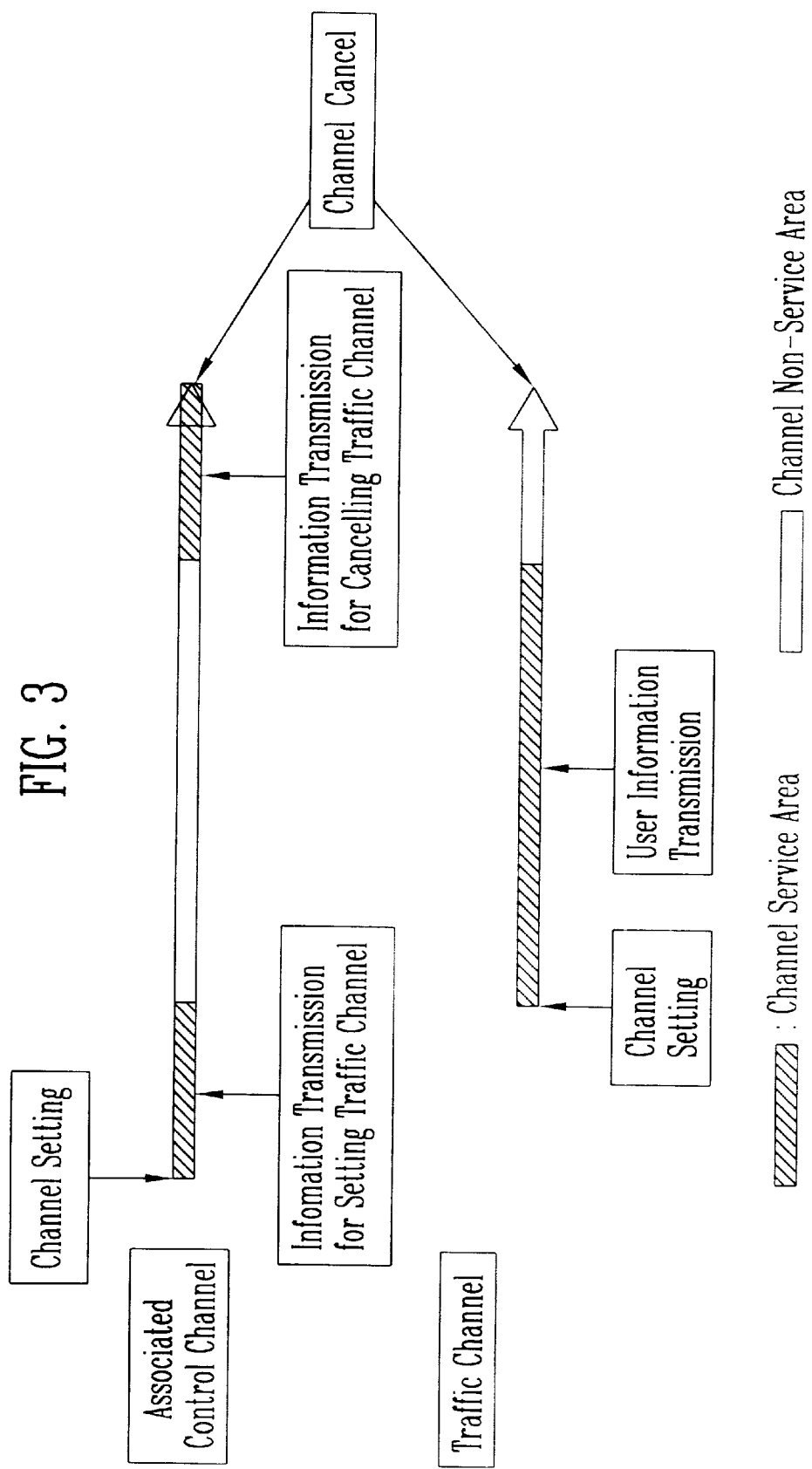
FIG. 3 shows an assignment and cancellation timing diagram of associated control channel and traffic channel constructed between mobile station and base station shown in FIG. 1.

FIG. 3 shows an assignment and cancellation timing diagram of ACCH and TCH constructed between mobile station and base station.

At first, usage time and information transmission of each channel are described as follows.

The mobile communication system using out-of-band signal method assigns ACCH and TCH for communicating between mobile station and base station and can not use other mobile station. In general, ACCH is assigned at first, and TCH is assigned if the communication entity can be connected by protocol using the TCH. After the TCH is set, ACCH is scarcely used until a protocol for cancelling the TCH is performed. If a hand over or procedure changing the property of traffic channel do not occur during the user informations are transmitted and received using TCH, ACCH is not used until the TCH cancellation procedure is performed.

Figure 4:
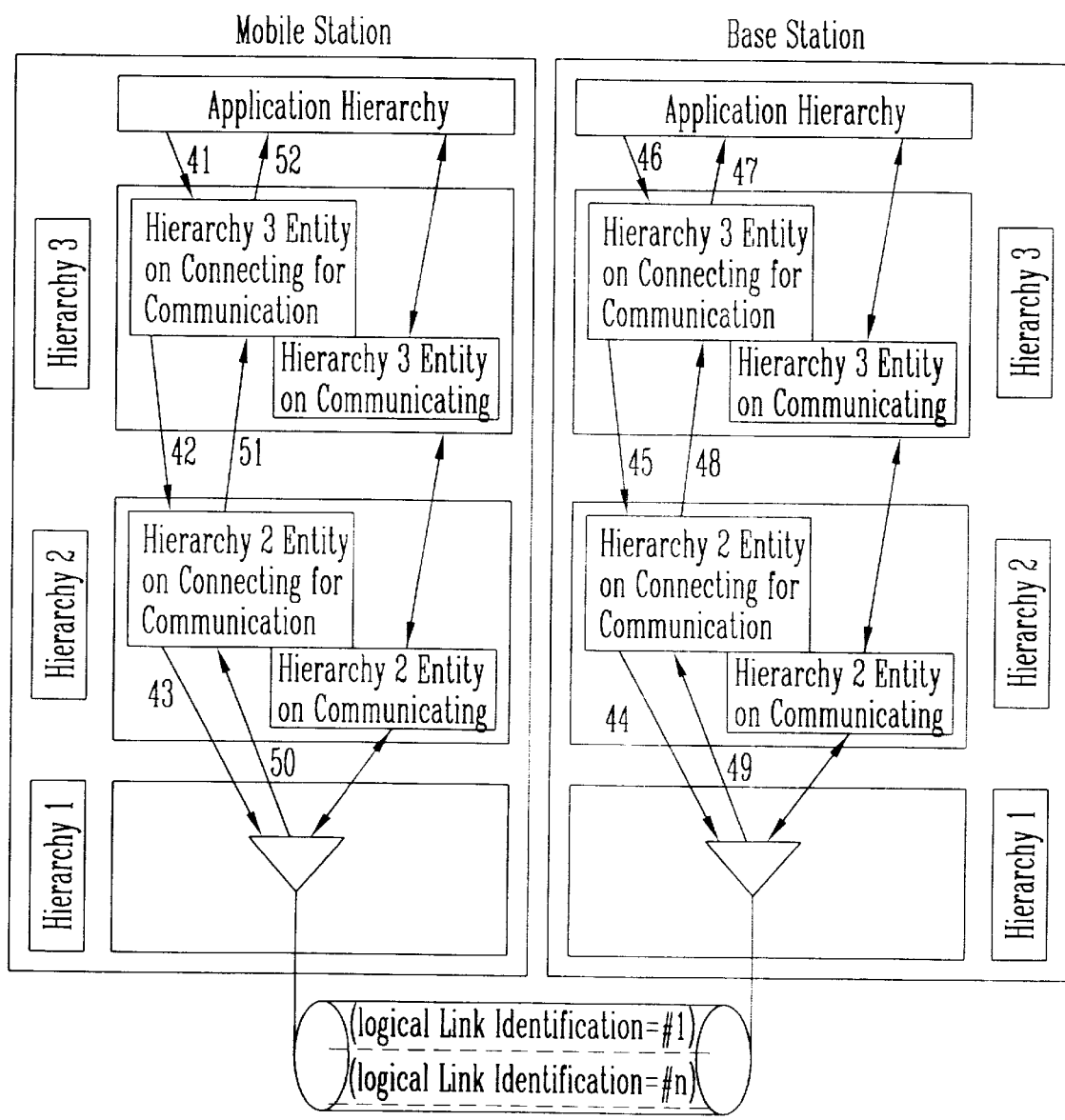
FIG. 4 is a flow chart showing that mobile station and base station set a number of logical link using a signal channel in accordance with the invention.

FIG. 4 is a flow chart showing that mobile station and base station set a number of logical link using a signal channel in accordance with the invention.

Comparing to OSI (Open System Interconnection) 7 hierarchies, protocol entity performing operations concerned with call setting, maintenance and cancelling is hierarchy 3, and a function that reliably transfers information of the hierarchy 3 between links and constructs multiple logical channel in a physical channel is provided in hierarchy 2. After receiving a request for setting new call from user (step 41), the mobile station hierarchy 3 protocol entity transfers connection request intention to the mobile station hierarchy 2 protocol entity using suitable primitive (for example, DE_ESTABLISH_REQ) defined between hierarchies for connecting call (step 42).

The mobile station hierarchy 2 protocol entity sets Logical Link Identification (LLI) and link setting flag which were not used and transmits them to the hierarchy 2 communication entity by way of a physical hierarchy (step 43).

Also, the base station hierarchy 2 protocol entity receives the logical link identification and the link setting flag from the mobile station hierarchy 2 protocol entity by way of a physical hierarchy (step 44) and transmits connection request intention to the base station hierarchy 3 entity using a suitable primitive (for example, DL_ESTABLISH_IND) defined between hierarchies (step 45).

The base station hierarchy 3 protocol entity transmits the connection setting request of mobile station to an application hierarchy of base station (step 46). If the base station application hierarchy can accept the connection setting, the connection setting is informed to the hierarchy 3 of base station (step 47), and then hierarchy 3 of base station transmits the connection acceptance intention to hierarchy 2 of base station using primitive (for example, DL_ESTABLISH_RSP) (step 48).

The hierarchy 2 protocol entity of base station sets the logical link identification value with the same value of logical link identification which is transmitted by way of a physical hierarchy and then transmits this value to the hierarchy 2 communication entity of mobile station (step 49). The hierarchy 2 protocol entity which has received the same logical link identification that the base station has transmitted (step 50) transmits the fact that the requested connection setting has been completed to the hierarchy 3 protocol entity of mobile station, using suitable primitive (DE_ESTABLISH_CNF) defined between hierarchies (step 51).

Finally, the hierarchy 3 of mobile station informs the application hierarchy which has received the connection request from user that the connection has been set (step 52). When a number of users request communication service using a mobile station, by constructing a number of logical channel on a physical channel using the procedure described above, the service for a number of call can be provided logically though only one signal channel can be set physically.

Having described preferred embodiment of the invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

The invention can use transmission capacity of signal channel to the full by transmitting signal informations of other users using the signal channel which is idle situation for a long time during the transmission and reception of informations is performed continuously through active traffic channel in the radio service area, set call rapidly since access procedure for setting call is not needed and extend service provision ability since signal channel sharing with a number of user can minimize the interference between channels caused by assignment of new radio channel.

While the present invention has been described and illustrated herein with reference to the preferred embodiment thereof, it will be understood by those skilled in the art that various changes in form and details may be made therein without departing from the spirit and scope of the invention.

What is claimed:

1. A method for sharing an associated control channel in a mobile communication system, comprising the steps of:

assigning a physical associated control channel between a mobile station and a base station and assigning a number of logical channels to the associated control channel, in order that a number of users can request communication service simultaneously through the mobile station;

setting a logical link identification and a link setting flag not used when the mobile station receives a request for a new call setting, and transmitting a connection setting request to the base station through the physical associated control channel;

informing the mobile station that the connecting and setting of logical link identification is completed through the physical associated control channel when the base station receives the connection request from the mobile station; and setting a traffic channel for transmitting user information after completing the connection setting 2. The method according to claim 1, wherein the setting a logical link step comprises the steps of:

transmitting a connection request intention to a mobile station hierarchy 2 protocol entity to connect calls using a desired primitive defined between hierarchies when a mobile station hierarchy 3 protocol entity receives a request for setting new calls from users;

transmitting the logical link identification and the link setting flag to the base station hierarchy 2 communication entity through the physical associated control channel when the protocol entity of the mobile station hierarchy 2 sets logical link identification and link setting flag is not used;

transmitting a connection request intention to a base station hierarchy 3 protocol entity using a suitable primitive defined between hierarchies when the base station hierarchy 2 protocol entity receives the logical link identification and the link setting flag from the mobile station hierarchy 2 protocol entity through the physical associated control channel; and transmitting a connection setting request of the mobile station to an application hierarchy using a base station hierarchy 3 protocol entity.

3. The method according to claim 1, wherein the informing step comprises the steps of:

informing a hierarchy 3 protocol entity of the base station of the connection setting when a base station application hierarchy can accept the connection setting, and transmitting a connection acceptance intention to a hierarchy 2 protocol entity of the base station using a primitive of the hierarchy 3 protocol entity of the base station;

setting the same logical link identification that a communication entity transmitted by way of a physical hierarchy by the hierarchy 2 protocol entity base station, and then transmitting the logical link identification to the hierarchy 2 protocol entity of the mobile station;

informing a hierarchy 3 protocol entity that the requested connection setting has been completed using a suitable primitive defined between hierarchies by the hierarchy 2 protocol entity of the base station which received the same logical link identification that the mobile station transmitted; and informing that the connection was set to the application hierarchy which received the connection request from the user using a hierarchy 3 protocol of the mobile station.

* * * * *